United States Patent
Tristram et al.

(10) Patent No.: US 11,482,928 B2
(45) Date of Patent: Oct. 25, 2022

(54) ADAPTIVE SLOPE COMPENSATION

(71) Applicant: Dialog Semiconductor (UK) Limited, London (GB)

(72) Inventors: Rebecca Tristram, Oxford (GB); Mark Childs, Swindon (GB); Jens Masuch, Munich (DE)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 16/731,593

(22) Filed: Dec. 31, 2019

(65) Prior Publication Data

US 2021/0203225 A1 Jul. 1, 2021

(51) Int. Cl.
*H02M 3/158* (2006.01)
*H02M 1/00* (2006.01)
*H02M 3/156* (2006.01)

(52) U.S. Cl.
CPC ........... *H02M 3/156* (2013.01); *H02M 3/158* (2013.01); *H02M 1/0025* (2021.05)

(58) Field of Classification Search
CPC ......... H02M 2001/0025; H02M 3/518; H02M 3/156; H02M 2001/0016; H02M 1/143
See application file for complete search history.

(56) References Cited

U.S. PATENT DOCUMENTS

| | | | |
|---|---|---|---|
| 4,253,140 A * | 2/1981 | McMurray | ............ H02M 7/525 363/136 |
| 4,672,518 A | 6/1987 | Murdock | |
| 4,837,495 A | 6/1989 | Zansky | |
| 7,265,530 B1 | 9/2007 | Broach et al. | |
| 7,425,819 B2 | 9/2008 | Isobe | |
| 8,138,740 B2 | 3/2012 | Yuan | |
| 9,899,921 B1 | 2/2018 | Paduvalli | |
| 2006/0043951 A1 | 3/2006 | Oswald et al. | |
| 2007/0013355 A1* | 1/2007 | Liao | ...................... H02M 3/156 323/288 |

(Continued)

FOREIGN PATENT DOCUMENTS

WO    WO 2016207760    12/2016

OTHER PUBLICATIONS

German Office Action, File No. 10 2020 201 765.4, Applicant: Dialog Semiconductor (UK) Limited, dated Nov. 2, 2020, 8 pages.

(Continued)

*Primary Examiner* — Gustavo A Rosario-Benitez
(74) *Attorney, Agent, or Firm* — Saile Ackerman LLC; Stephen B. Ackerman

(57) ABSTRACT

A solution is provided for adaptive slope compensation in a DC-DC switching converter. Jitter is reduced for on times less than 50% Tpd by using two or more different slopes for the compensation ramp. Additionally, any discontinuities at the 50% duty cycle point are reduced. Details of the compensation ramp are described, where the ramp rate for the first half of the switching period, for on times greater than 50% Tpd, decreases with increasing on time until, at an on time of 100% Tpd, it is approximately zero. In addition, the ramp rate for the second half of the switching period, for on times greater than 50% Tpd, decreases with decreasing on time until, at a duty of 50%, it is equal to the ramp rate used for the first half of the switching period.

13 Claims, 9 Drawing Sheets

(56) References Cited

U.S. PATENT DOCUMENTS

| | | | | |
|---|---|---|---|---|
| 2007/0200633 | A1* | 8/2007 | Chen | H02M 3/1563 331/1 A |
| 2007/0296389 | A1* | 12/2007 | Chen | H02M 3/158 323/290 |
| 2008/0231247 | A1* | 9/2008 | Uehara | H02M 3/158 323/284 |
| 2009/0122578 | A1 | 5/2009 | Beltran | |
| 2009/0160416 | A1 | 6/2009 | Kawagishi et al. | |
| 2009/0237058 | A1 | 9/2009 | Mulligan et al. | |
| 2010/0008108 | A1* | 1/2010 | Xiaowu | H02M 3/33523 363/21.15 |
| 2010/0253313 | A1 | 10/2010 | Herzer et al. | |
| 2011/0115458 | A1 | 5/2011 | Schafmeister et al. | |
| 2011/0187342 | A1 | 8/2011 | Yuan | |
| 2012/0049826 | A1* | 3/2012 | Hsu | H02M 3/1588 323/284 |
| 2012/0249106 | A1 | 10/2012 | Wu | |
| 2013/0043856 | A1 | 2/2013 | Wang et al. | |
| 2013/0099761 | A1* | 4/2013 | Dong | H02M 3/156 323/288 |
| 2014/0132236 | A1 | 5/2014 | Danmawaskita et al. | |
| 2014/0239925 | A1 | 8/2014 | Tanabe et al. | |
| 2014/0239935 | A1 | 8/2014 | Nene | |
| 2014/0266110 | A1 | 9/2014 | Yuan et al. | |
| 2014/0347030 | A1* | 11/2014 | Min | H02M 1/143 323/288 |
| 2015/0200593 | A1 | 7/2015 | Stoichita et al. | |
| 2017/0182894 | A1* | 6/2017 | Yamaguchi | H02M 3/1582 |
| 2018/0358990 | A1* | 12/2018 | Kranz | H03F 3/45475 |
| 2019/0097518 | A1 | 3/2019 | Tanabe | |
| 2021/0211048 | A1* | 7/2021 | Yu | H02M 3/158 |

OTHER PUBLICATIONS

"Understanding non-linear slop-compensation: a graphical analysis," by Greg Smith, National Semiconductor, Slope Compensation, CMC Circtuits, EE Times-India, Nov. 2007, eetindia.com, pp. 1-5.

"Design of a Novel Nonlinear Slope Compensation Circuit for Peak Current-mode Boose DC-DC Converter," by Chaodong Ling et al., 2010 International Conference on Anti-Counterfeiting Security and Identification in Communication (ASID), Jul. 18-20, 2010, pp. 63-66.

"Modeling and Loop Compensation Design of Switching Mode Power Supplies," by Henry J. Zhang, Linear Technology, Application Note 149, Jan. 2015, pp. 1-22.

"Compensation Design for Peak Current-Mode Buck Converters," Applicaiton Note AN028—Apr. 2014, Copyright 2014 Richtek Technology Corporation, pp. 1-13.

\* cited by examiner

900

910
Providing a compensation ramp comprising two or more zones, with each zone having a distinct slope value

920
Modifying the compensation ramp and the zones that make up the compensation ramp responsive to a duty cycle

930
Maintaining a maximum ramp current contribution for all values of an output voltage V_OUT at an end of a switching period, or for on times >50% of a total switching cycle time Tpd, maintaining a constant offset value for all V_OUT at a point of use

FIG. 9

ADAPTIVE SLOPE COMPENSATION

RELATED PATENT APPLICATION

This application is related to U.S. patent application Ser. No. 15/718,030, filed on Sep. 28, 2017, which is owned by a common assignee, and is herein incorporated by reference in its entirety.

BACKGROUND

Field

The present disclosure relates generally to all types of DC-DC switching converters, and more specifically to a Buck converter with adaptive slope compensation.

Background

Today's high performance electronic systems need increasingly higher performance from power supply subsystems, requiring higher operating efficiencies and load currents. This is especially true in battery power portable equipment. Step down DC-DC converters, most commonly buck converters employing Pulse Width Modulation (PWM), are frequently used to serve these requirements.

Current-mode controlled buck regulators regulate the current supplied to a power inductor, to regulate the output voltage. A current-mode controller operates using two loops: an internal current loop, which regulates the inductor current, and an outer voltage loop.

FIG. 1 illustrates 100, a circuit diagram for current-mode control, in a buck switching converter of the prior art. Because internal current loop I_FB forms a high bandwidth loop, inductor L1 may be modeled as a current source, such that the power-stage's transfer function is a first order function with a single pole defined by output capacitor C1 and the resistive LOAD. The compensation required to stabilize the current-mode controller in 110 is much less complex than that required for the voltage-mode controller for V_FB, and the overall performance is much better. A voltage feedback loop compares the sensed output voltage V_FB, on the inverting input, with a reference voltage V_ref, on the non-inverting input, in comparator 130. Comparator 120 compares the inductor current, on the inverting input, with the output of comparator 130.

However, current-mode controllers may be unstable in some circumstances, for example when the required duty cycle (V_OUT/V_IN) is higher than 50% when the inductor's peak current is regulated (peak-mode control, when high-side switch S1 on time is greater than 50% of the total switching cycle time Tpd), or when the required duty cycle (V_OUT/V_IN) is lower than 50% when the inductor's valley current is regulated (valley-mode control, when low-side switch S2 on time is greater than 50% of the total switching cycle time Tpd). Current-mode controllers have a tendency towards sub-harmonic oscillation, non-ideal loop responses, and an increased sensitivity to noise. Slope compensation, where a slope is added to the measured inductor current, may be employed to overcome these difficulties.

FIG. 2 shows 200, a circuit diagram for current-mode control, in a buck switching converter, where a slope compensation ramp is added to the measured inductor current. Similar to FIG. 1, there is a voltage feedback loop, which compares the sensed output voltage V_FB with a reference voltage V_ref in comparator 230. Without a slope compensation ramp, the current-mode controller in 210 exhibits sub-harmonic oscillation for (V_OUT/V_IN) exceeding 50% when the inductor L1's peak current is regulated, or for (V_OUT/V_IN) less than 50% when the inductor L1's valley current is regulated. To overcome this problem, slope compensation may be added to the measured inductor current I_FB. An adder 240 is inserted between comparator 220 and the inductor current to enable a fixed slope, represented by sawtooth signal 250, to be added to the measured inductor current/voltage to generate a slope compensated signal applied to the input of the comparator.

However, the power density and output current requirements of today's portable equipment are pushing the bounds of prior art topologies and control methods. Next generation buck converter designs used in high performance portable equipment require a wide range on the operating duty cycle, while the output inductor value is minimized to allow for greater system performance. This has increased the challenge of implementing the slope compensation ramp, especially while operating in valley mode. Take for example, under the following operating conditions the peak of the slope compensation ramp would be nearly 10A.

Theoretical minimum required compensation ramp
slope for valley mode=$[V\_IN-V\_OUT]/[2*L1]$
where:

Output Inductor L1=50 nH
Input Voltage V_IN=4.8V
Output Voltage V_OUT=0.3V
Slope=45A/µs
Cycle Period (*)=110 nsec→toff time~103 ns→height of slope at end of cycle=4.635A For peak mode, the theoretical minimum required compensation ramp slope would be $[V\_OUT/[2*L1]]$. Valley mode is more prone to need a larger compensation ramp due to the introduction of V_IN into the equation. This is only valid for typical use-cases where [V_IN−V_OUT]>>V_OUT.

If a large range of V_OUT and V_IN is considered, then the ramp is usually set to the most extreme conditions, for example maximum V_OUT for peak mode, and maximum V_IN and minimum V_OUT for valley mode, so that all conditions can recover from sub-harmonic conditions. This means that in some cases, there is too much compensation ramp added, and in others, just enough.

FIG. 3 illustrates 300, where a steep slope compensation ramp is used in a buck switching converter of the prior art. There are a number of issues that may arise with a large compensation ramp 305, including ramp signal headroom 310, especially with high peak-mode or low valley-mode duty cycle conditions. Also, with a steeper compensation ramp, there may be an error in the final ramp value 320, caused by the delay between when the ramp should be terminated and the actual time of the ramp signal termination, impacting regulation performance. The steeper the ramp, the worse this issue is.

With a steep slope compensation ramp, the amount of offset caused by the ramp termination delay may further increase the offset, and the larger offset causes variation of the current limit threshold for different operating duty cycles. Also, with too large a compensation ramp, the buck control scheme becomes closer to voltage mode as opposed to current mode, resulting in a lower phase margin, which may not be compensated for in the system designed originally for current mode operation.

As an alternative to the steep slope compensation ramp of FIG. 3, other prior art control methods implement slope compensation only during switching cycles when the high-side switch for peak-mode, or the low-side switch for valley-mode, have an on time greater than 50% of the total switching cycle time Tpd, where the on time is that of the PMOS switch in peak mode, and that of the NMOS switch in valley mode.

FIG. 4 shows 400, where a slope compensation ramp is used, for the high-side or low-side switch having an on time greater than 50% Tpd. This prior art solution introduces a different set of shortcomings. When the switching converter is operating at or near the 50% duty cycle point, it is at the edge of when slope compensation 405 is either enabled or disabled on a cycle by cycle basis. This creates operational jitter, which impacts output ripple, output regulation, and/or loop stability. In addition, while the greatest benefit from slope compensation is realized by switching cycles exceeding 50% on time for the high-side switch during peak-mode, or exceeding 50% on time for the low-side switch during valley-mode, there is a need for slope compensation for switching cycles less than 50% on time, as well.

SUMMARY

Accordingly, it is an object of one or more embodiments of the present disclosure to provide an adaptive slope compensation method in a DC-DC switching converter.

It is a further object of one or more embodiments of the disclosure to reduce the required ramp headroom and operational jitter at or around the 50% duty cycle operating point of the switching converter.

Still further, it is an object of one or more embodiments of the disclosure to describe an implementation of a DC-DC switching converter that is stable in operating conditions with minimized complexity.

Other objects will appear hereinafter.

The above and other objects of the present disclosure may be accomplished in the following manner. A circuit for adaptive slope compensation, in a DC-DC switching converter, is disclosed, comprising a compensation ramp, proportional to a down-slope of a current in an inductor, summed with other contributions from the system to determine the final on time. The compensation ramp further comprises two or more zones, with each zone having a distinct slope value. The compensation ramp is configured to be responsive to a particular operational duty cycle, and to maintain a maximum ramp current contribution at the end of the switching period (embodiment 1), or for on times >50% Tpd, a constant offset value for all V_OUT at the point of use (embodiment 2).

The above and other objects of the present disclosure may be further accomplished by a method for adaptive slope compensation, in a DC-DC switching converter. The steps include providing a compensation ramp comprising two or more zones, with each zone having a distinct slope value. The steps also include modifying the slope compensation ramp and the zones that make up the compensation ramp responsive to a duty cycle. The steps also include maintaining a maximum ramp current contribution for all values of an output voltage V_OUT at the end of the switching period (embodiment 1), or for on times >50% of the total switching cycle time Tpd, a constant offset value for all V_OUT at the point of use (embodiment 2).

In various embodiments the function may be achieved with other types of DC-DC switching converters using current mode control, for example, a boost or a buck-boost.

BRIEF DESCRIPTION OF THE DRAWINGS

The present disclosure will be more clearly understood from the following description taken in conjunction with the accompanying drawings in which like reference numerals designate similar or corresponding elements, regions and portions and in which:

FIG. 9 is a flow chart of a method for adaptive slope compensation, in a DC-DC switching converter.

DETAILED DESCRIPTION

The present disclosure enables slope compensation in a DC-DC switching converter while alleviating the drawbacks of prior art solutions. This includes reducing the required compensation ramp headroom, and operational jitter at or around the 50% duty cycle operating point. Furthermore, the preferred embodiment describes an implementation that is stable in operating conditions with minimized implementation complexity.

The slope compensation ramp of the present disclosure provides compensation for sub-harmonic oscillation, when the on time of the high-side switch is greater than 50% for peak-mode, or the on time of the low-side switch is greater than 50% for valley-mode. The preferred embodiment makes the offset due to the ramp constant across multiple duty cycles (so that it can be removed easily), in addition to using two separate compensation ramps summed together to produce a final compensation. There is also the possibility of having one circuit providing both compensation ramps.

In DC-DC switching converters using current mode control, a representation of the output current is used to determine when the converter switches. This is proportional to the demanded output current, and the current loop helps to regulate the output voltage quicker than voltage mode alone. The representation of the output current can be used as a form of current limit and matches peak-mode and valley-mode currents for switching converters with mixed types of controls. It becomes necessary to add a compensation ramp to a current-mode converter to prevent sub-harmonic oscillation.

Figure 5A:
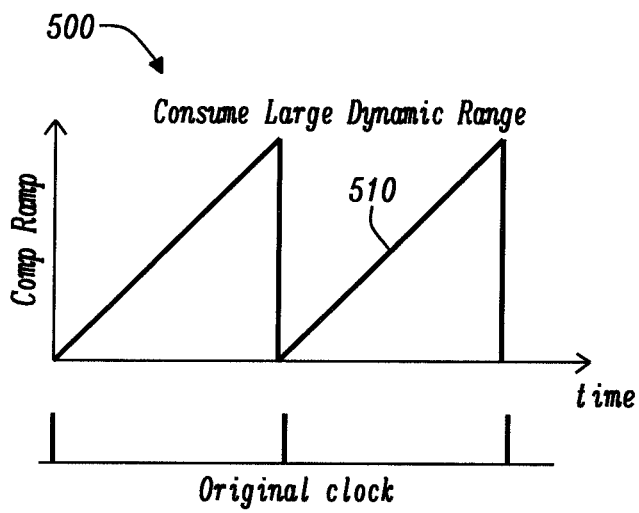
FIG. 5A shows a slope compensation waveform with a large dynamic range.
Figure 5B:
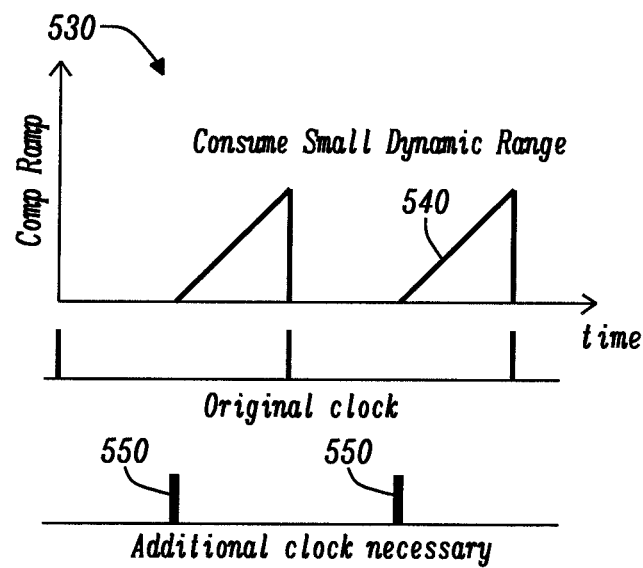
FIG. 5B illustrates a slope compensation waveform with a small dynamic range and an additional clock.
Figure 5C:
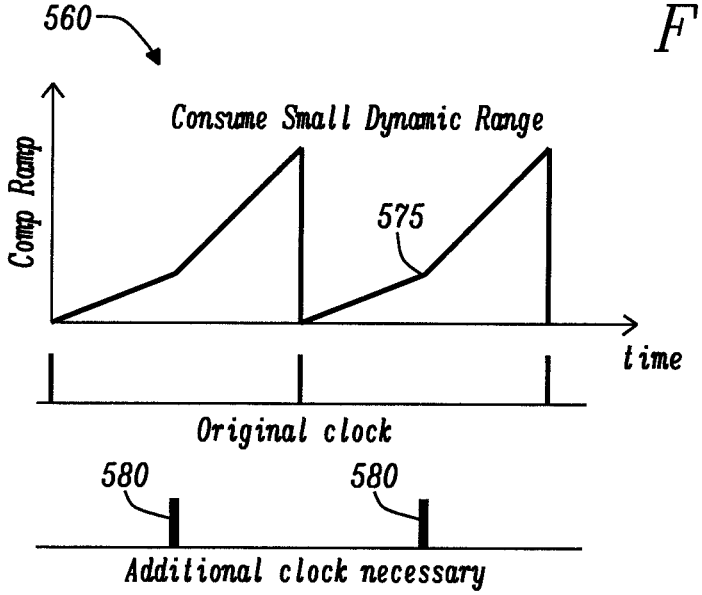
FIG. 5C shows a slope compensation waveform with a small dynamic range and an additional clock, of the disclosure.

In most cases a standard compensation ramp is added that is proportional to the maximum down-slope of current in an inductor in peak mode, or proportional to the maximum up-slope of current in an inductor in valley mode, as illustrated in FIGS. 5A-5C, with only one ramp rate per half-period. This is added during the on-time of a high side switching device for peak-mode, or during the on-time of a low-side switching device for valley-mode, where the slopes are typically steeper.

FIG. 5A shows slope compensation waveform 500, with a large dynamic range. Slope voltage (V) compensation 510 is represented vs time (μs), for a large dynamic range of a DC-DC switching converter. Note that 500 may also be represented as current vs time depending on the type of control (for example, if added to the output current of an operational transconductance amplifier (OTA)). A large dynamic range indicates a long on time case, for example a high output voltage in peak mode or a high input voltage and a low output voltage in valley mode, of a DC-DC switching converter.

Compensation ramps add an offset to the point at which the current comparison is made. This can mean that key elements in the design require higher dynamic range than is otherwise needed, and peak/valley current control inaccuracy is introduced in the system (unless removed with a separate circuit) as this offset traditionally varies with duty cycle. Sub-harmonic oscillation happens when the decision to turn off the switching device, high-side in peak-mode or low-side in valley-mode, occurs in the second half of the switching period. Therefore, the compensation ramp is only required for the second half of the switching period. This leads to the use of half-period ramps, which introduce less offset to the current signal.

FIG. 5B illustrates slope compensation waveform 530, with a small dynamic range and an additional clock. This is the case where the starting point of slope voltage compensation 540 is not at the beginning of the period, but just before the half period point, because the compensation is not necessary for on times less than 50% of the total switching cycle time Tpd. Here, a smaller dynamic range is consumed, because during the first half period the slope voltage signal is flat. Note that additional clock 550 is needed to trigger the slope compensation. The variation in offset for on times >50% is the same as in FIG. 5A.

It is also known that compensation ramps reduce jitter, by making the point at which the measured current exceeds the current control signal more well defined. With a ramp that only starts halfway through the switching period, for on times less than 50% the total switching cycle time Tpd, this means that no compensation is added. It is therefore beneficial to add some lower amount of compensation for the first half of the switching period, to reduce jitter. This leads to the use of a compensation ramp with two distinct slopes, with a change in slope around the middle of the switching period, as used in the current disclosure.

FIG. 5C shows slope compensation waveform 560, with a small dynamic range, and an additional clock, of the disclosure. As compared to FIG. 5A, slope voltage compensation 575 is shallower at the beginning of the period, and as compared to FIG. 5B two distinct slopes are required. After some delay, to achieve the target slope for on times greater than 50% the total switching cycle time Tpd, the slope voltage becomes steeper. Note that additional clock 580 is needed to trigger the slope compensations.

Related U.S. patent application Ser. No. 15/718,030, filed on Sep. 28, 2017, addresses the issue of the large offset a compensation ramp introduces, namely reducing the dynamic range of the switching converter in current-mode. It also removes the requirement for a second clock, to trigger the ramp halfway through a switching period.

Figure 6A:
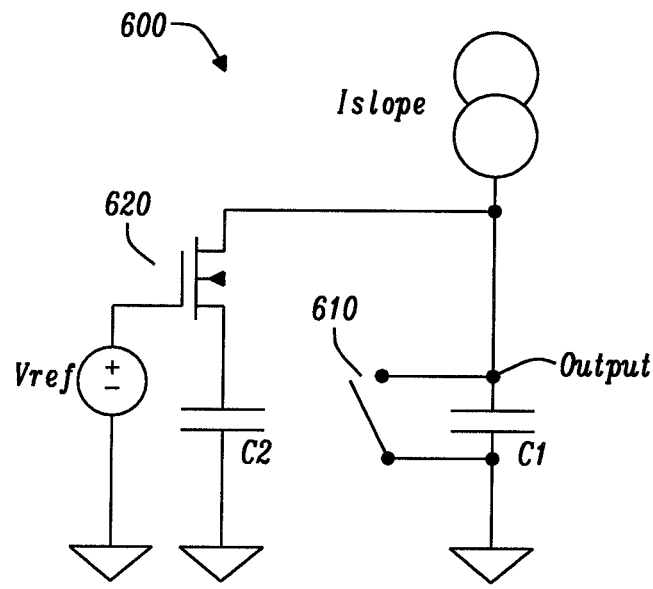
FIG. 6A illustrates a first slope compensation configuration circuit of a related US patent application.

FIG. 6A illustrates 600, a first slope compensation configuration circuit of related U.S. patent application Ser. No. 15/718,030, filed on Sep. 28, 2017. The circuit comprises first capacitor C1, and current source Islope into the first capacitor, at the drain of first transistor 620, where the first transistor can be a MOS device. Switch 610, connected across the first capacitor at the output, creates a slope on a voltage compensation signal. This configuration further comprises second capacitor C2, and voltage reference Vref. The gate of the first transistor is connected to the voltage reference, and the source of the first transistor is connected to the second capacitor.

Figure 6B:
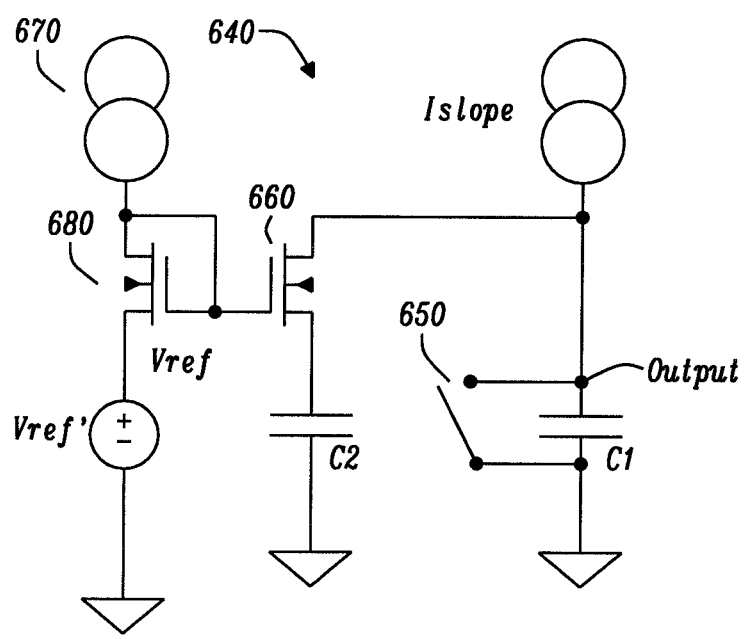
FIG. 6B shows a second slope compensation configuration circuit of a related US patent application.

FIG. 6B shows 640, a second slope compensation configuration circuit of related U.S. patent application Ser. No. 15/718,030, filed on Sep. 28, 2017. Here the voltage reference Vref is now achieved with a compensated voltage reference Vref'+Vgs. The circuit comprises first capacitor C1, and first current source Islope into the first capacitor, at the drain of first transistor 660, where the first transistor can be a MOS device. Switch 650, connected across the first capacitor at the output, creates a slope on the voltage compensation signal. This configuration further comprises second capacitor C2 and a compensated voltage reference Vref'. The gate of the first transistor is connected to virtual reference Vref=Vref'+Vgs, and the source of the first transistor is connected to the second capacitor. This configuration further comprises second current source 670, at the drain of second transistor 680, where the second transistor can be a MOS device. The source of the second transistor is connected to the voltage reference Vref', and its gate is connected to its drain, also the gate of the first transistor at the virtual compensated reference Vref.

The circuits of FIGS. 6A & 6B are not used in the present disclosure but illustrate how V_OUT and V_IN control when the switching of the compensation ramp occurs. The main difference is that the present disclosure uses a clock in anti-phase with the main clock to control the switching of the compensation ramp, where the ramp current varies with V_OUT and V_IN, but the control does not. The present disclosure describes an adaptive slope compensation method in which the compensation ramp is comprised of two or more zones, with each zone having a distinct slope value. Furthermore, the slope compensation ramp and the zones that make up the compensation ramp are responsive to the particular operational duty cycle of the DC-DC switching converter.

Figure 7A:
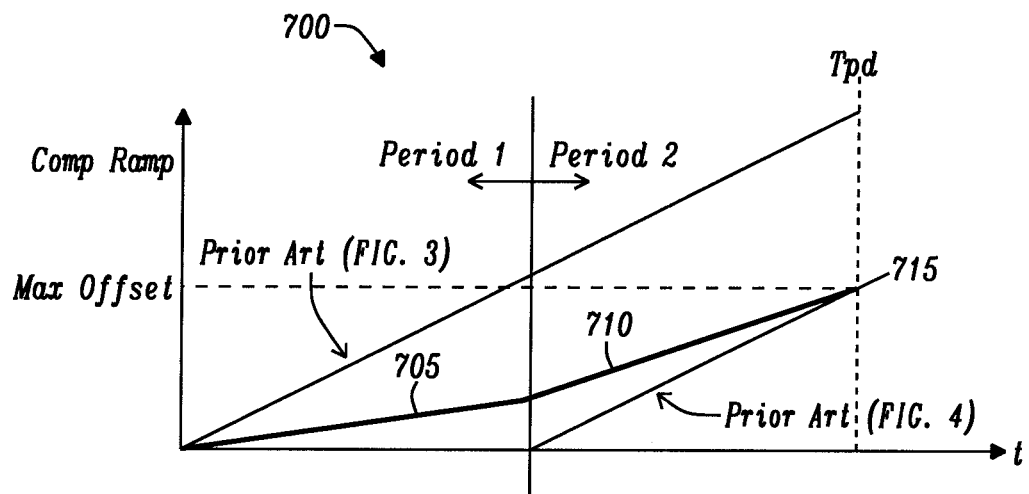
FIG. 7A illustrates the slope compensation ramp while operating with an on time between 50% and 100% of the total switching cycle time Tpd, of the disclosure.
Figure 7B:
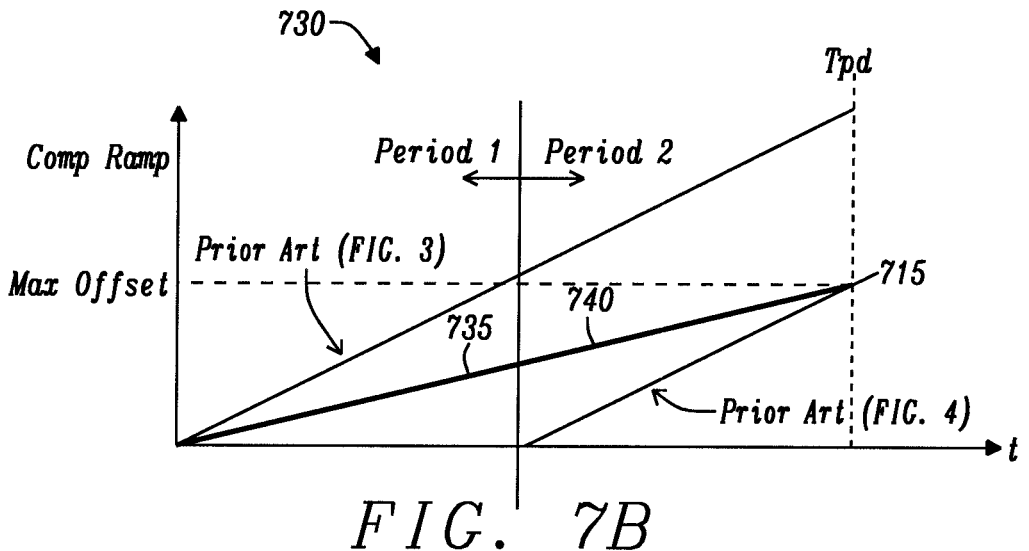
FIG. 7B illustrates the slope compensation ramp while operating with an on time equal to or less than 50% the total switching cycle time Tpd, of the disclosure.
Figure 7C:
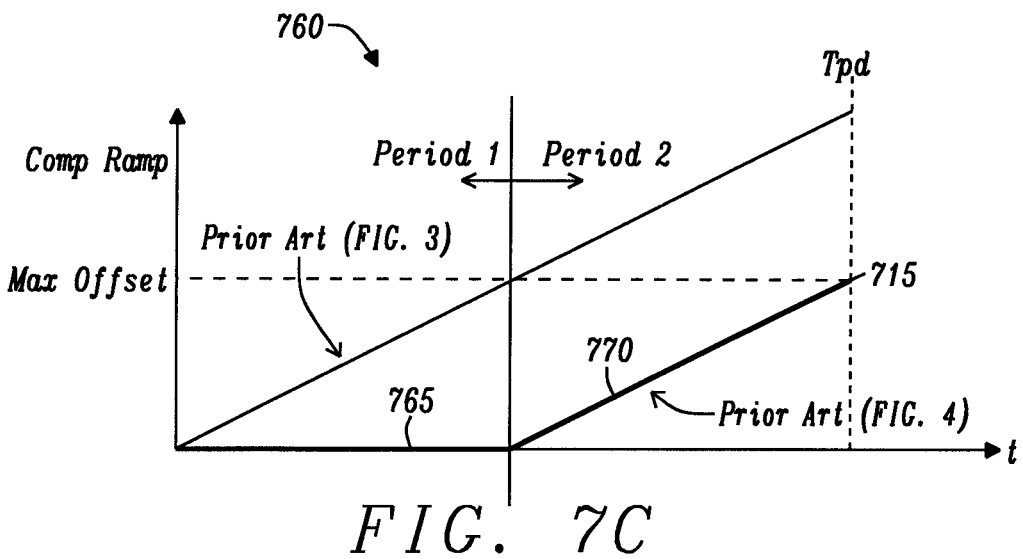
FIG. 7C shows the slope compensation ramp when the power converter is operating at 100% the total switching cycle time Tpd, of the disclosure.

The general operation of the disclosed adaptive slope compensation ramp is illustrated in FIGS. 7A, 7B, and 7C. The figures illustrate the slope compensation ramp at three different operating conditions over switching cycle duration, Tpd. FIG. 7A illustrates when the on time is between 50% and 100% Tpd. FIG. 7B illustrates when the on time is equal to or less than 50% Tpd. FIG. 7C illustrates when the on time is at 100% Tpd. The final value of current contributed from the slope at Tpd in all three cases is the same for all values of the output voltage V_OUT, namely [V_IN/[2*L1]]*Tpd. Also shown in FIGS. 7A, 7B, and 7C are the slope compensation ramps from the prior art examples of FIG. 3 and FIG. 4.

FIG. 7A illustrates 700, the slope compensation ramp while operating with an on time between 50% and 100% of the total switching cycle time Tpd, embodying the principles of the disclosure. During the second half of the switching cycle, Period 2, the compensation ramp slope is provided to allow the recovery from sub-harmonic conditions in the minimal amount of time, one clock cycle. This is the same as the up-slope of the current for valley-mode, and the same as the down-slope of the current for peak-mode. For example, the slope calculated while operating in valley-mode is:

Compensation Slope (A/sec)=$[V\_IN-V\_OUT]/L1$.

Figure 1:
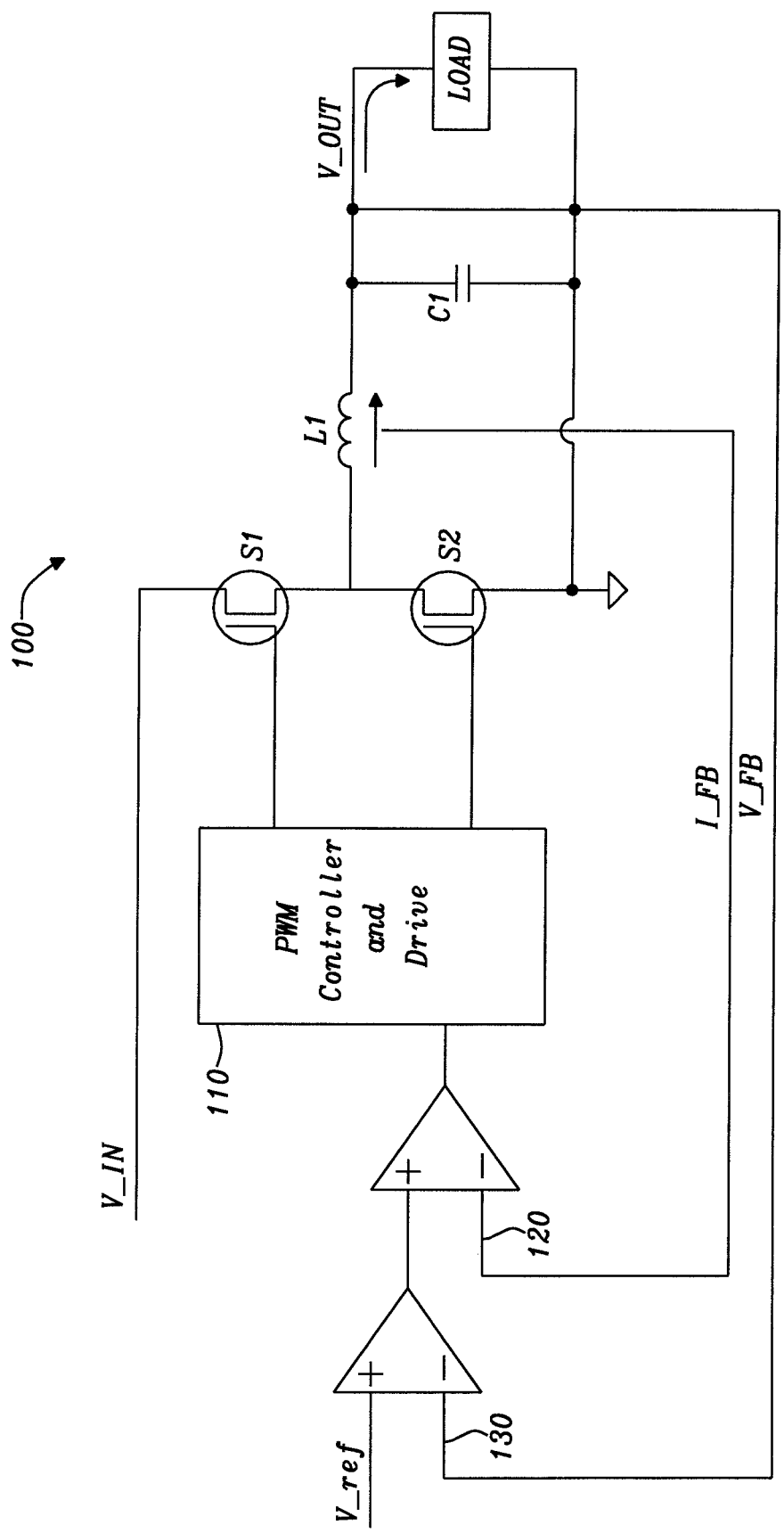
FIG. 1 illustrates a circuit diagram for current-mode control, in a buck switching converter of the prior art.
Figure 2:
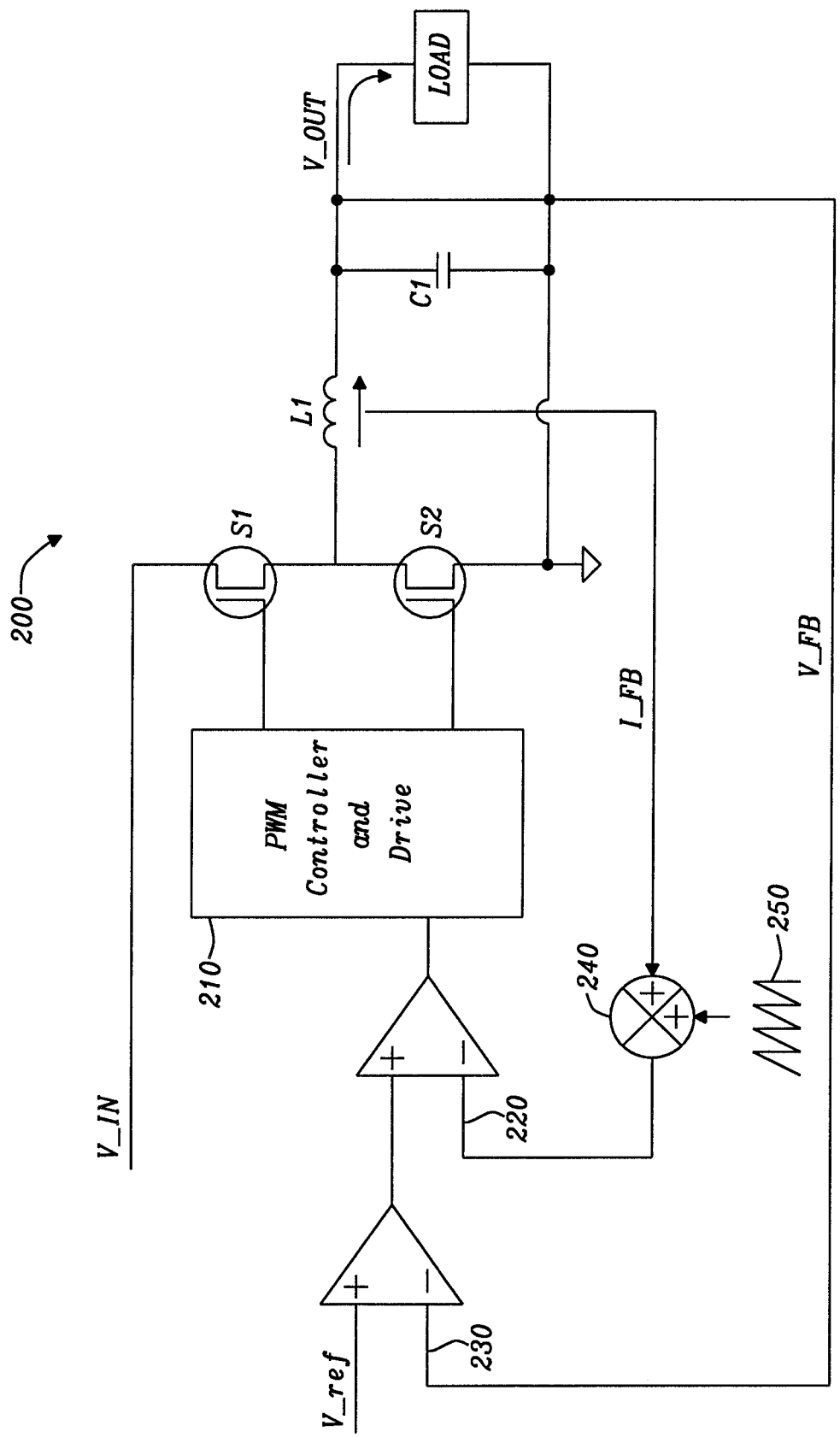
FIG. 2 shows a circuit diagram for current-mode control, in a buck switching converter, where a slope compensation ramp is added to the measured inductor current.
Figure 3:
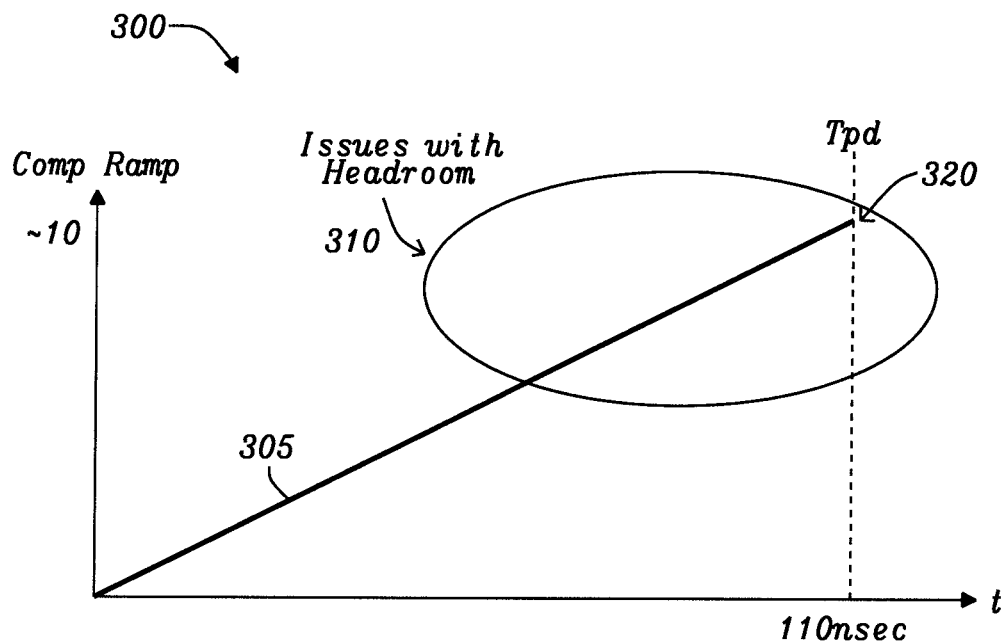
FIG. 3 illustrates where a steep slope compensation ramp is used, in a buck switching converter of the prior art.
Figure 4:
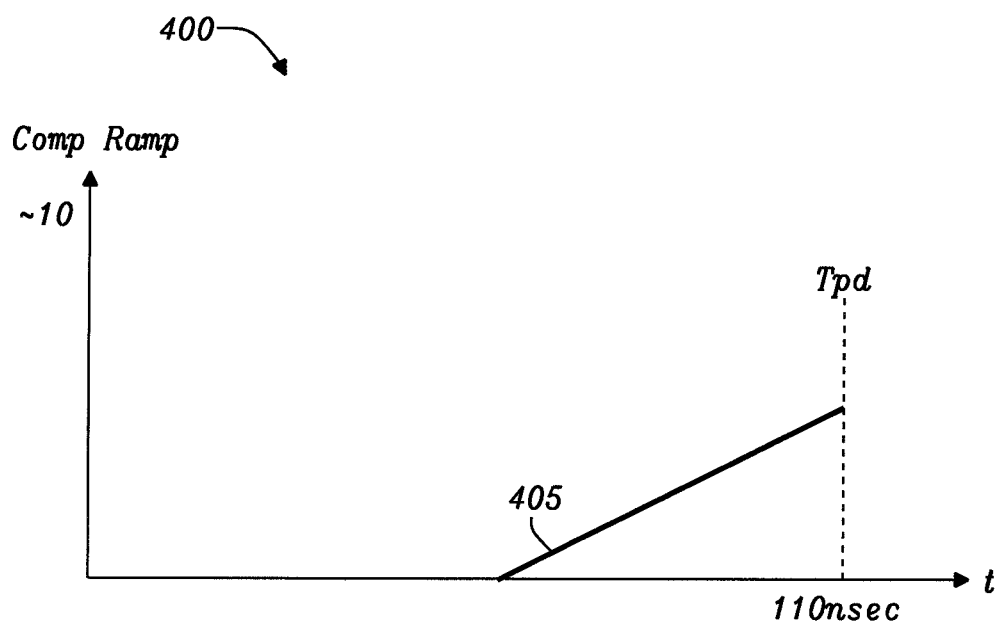
FIG. 4 shows where a slope compensation ramp is used, for the high-side or low-side switch having an on time greater than 50% of the total switching cycle time Tpd.

The slope compensation ramp of FIG. 7A resembles the slope compensation ramp described in Prior Art FIG. 4, as both provide fast sub-harmonic recovery while avoiding headroom issues found in Prior Art FIG. 3. However, there is a difference in Prior Art FIG. 4, where the compensation ramp, in order to avoid headroom issues, starts at or near the midpoint of the switching cycle. In the present disclosure, there is a first period, Period 1, that begins at the start of the switching cycle and ends at or near the midpoint of the switching cycle, and a second period, Period 2, that begins at or near the midpoint of the switching cycle and ends at the end of the switching cycle. Both periods have a compensation ramp with a calculated slope, slope 705 for Period 1 ramp1, and slope 710 for Period 2 ramp2. For the case when the on time is greater than 50% Tpd, the slope of the first period (ramp1) starts to decrease with increasing on time, resulting in 0A/sec at 100% Tpd.

FIG. 7B illustrates the slope compensation ramp while operating with an on time equal to or less than 50% the total switching cycle time Tpd. An important characteristic is that the slopes of the compensation ramps during Period 1, 735, ramp1, and Period 2, 740, ramp2 are the same. The termination point at the end of the switching cycle for the compensation ramps final current, in FIG. 7A, 715, and FIG. 7B, 715, is also the same for all V_OUT, namely [V_IN/[2*L1]]*Tpd. Note that the slope of the compensation ramp in FIG. 7B, 740, is less than the slope of the compensation ramp during Period 2 of FIG. 7A, 710. This avoids differences in the compensation ramp when jitter around 50% duty cycle is present. For valley mode, the slope of the total compensation ramp in Period 1 is equivalent to V_OUT/L1 and in Period 2 is equivalent to [V_IN−V_OUT]/L1. For peak mode, the slope of the total compensation ramp in Period 1 is equivalent to [V_IN−V_OUT]/L1 and in Period 2 is equivalent to [V_OUT]/L1. Two separate ramp circuits can create the final ramp, and then the contributions are summed together. If this is the case, if ramp1 is active for the whole on-time, then the slope value of ramp1 during Period 2 needs to be subtracted from the total slope during Period 2 when generating the two separate ramps (so that when ramp1 and ramp2 are summed together, the correct total slopes for Period 2 are generated).

Note that for on times greater than 50% Tpd, the resulting offset from the compensation ramp is constant. For on times below 50% Tpd, the resulting offset from the compensation ramp is not constant. However, the dynamic range of the compensation ramp is significantly reduced overall, especially if the slope is 0 or very shallow.

When operating with on times less than 50% Tpd, sub-harmonic effects are not as pronounced. Therefore, the slope of the compensation ramp is not required to ensure a worst-case sub-harmonic recovery. Also, there are benefits to slope compensation that go beyond sub-harmonic recovery and are beneficial at operation with on times both less than and greater than 50% Tpd. While the theoretical calculations suggest that slope compensation is not required while operating at less than 50% Tpd, because of parasitic effects, such as noise caused by Equivalent Series Inductance (ESL) or Equivalent Series Resistance (ESR) on the output capacitor, slope compensation is beneficial.

In contrast to the case in FIG. 7A, where the difference in the slopes between Period 1 ramp1 and Period 2 ramp2 were at a maximum, in FIG. 7B the difference in the slopes when the on time is less than 50% Tpd is at a minimum. FIG. 7B shows that the slopes of Period 1 ramp1 and Period 2 ramp2 are equivalent. In a non-limiting example, the calculation of the slope compensation ramp for a 50% low-side switch on time in valley-mode control, may be calculated by:

Total Slope Period 1=$[V\_OUT]/L1=[V\_IN/[2*L1]]$

Total Slope Period 2=$[V\_IN-[V\_IN/2]]/L1=[V\_IN/[2*L1]]$

Value at point of use (end of the on-time)=$0.5*Tpd*[V\_IN/[2*L1]]=[V\_IN/[4*L1]]*Tpd$ Final Value (at $Tpd$,715)=$[V\_IN/[2*L1]]*Tpd$ FIG. 7C shows 760, the slope compensation ramp when the power converter is operating at 100% the total switching cycle time Tpd. Period 1 765 ramp1, and Period 2 770 ramp2 indicate the slopes of the compensation ramps, when the required ramp is at its steepest. In a non-limiting example, the calculation of the slope compensation ramp in Period 2 for 75% low-side switch on time in valley-mode control may be calculated by:

75% low-side switch on time=25% high-side switch on time→$[V\_OUT=V\_IN/4]$

Total Slope Period 1=$[V\_OUT]/L1=[V\_IN/[4*L1]]$

Total Slope Period 2=$[V\_IN-[V\_IN/4]]/L1=[3*V\_IN/[4*L1]]$

Value at point of use (end of the on-time)=$0.5*Tpd*[V\_IN/[4*L1]]+0.25*Tpd*[3*V\_IN/[4*L1]]=[5*V\_IN/[16*L1]]*Tpd$ Final Value(at $Tpd$,715)=$0.5*Tpd*[V\_IN/[4*L1]]+0.5*Tpd*[3*V\_IN/[4*L1]]=[V\_IN/[2*L1]]*Tpd$ For embodiment 1, the final value at the end of the switching period 715 is the same value [V_IN/[2*L1]]*Tpd, in FIGS. 7A, 7B, and 7C, for maximum offset. The value at the point of use is the offset value at the end of the on time, which is also the same value in embodiment 2. For embodiment 1, the value at the end of the on time varies with duty cycle, and the value at the end of the switching period is constant. For embodiment 2, the value at the end of the on time is constant for all V_OUT (for greater than 50% on time) and the value at the end of the switching period is variable as a result. Note that the offset and value at the end of the switching cycle will still vary with V_IN if V_IN is a variable.

The shortcomings of the prior art approach illustrated in FIG. 4, while operating at or near 50% duty cycle, include irregular operation or jitter, as well as the absence of beneficial slope compensation for less than 50% Tpd. Note that when duty cycle is discussed in terms of V_OUT and V_IN, it refers to the ideal/set values of V_OUT and V_IN, and not the actual values.

The compensation ramp of the present disclosure, shown in FIG. 7A-7C, illustrates how both of these problems are overcome. The slope in Period 1 ramp1 is greater than zero, and the slope in Period 2 ramp2 is less than [V_OUT (max)/L1] for peak-mode, or [V_IN (max)−V_OUT (min)]/L1 for valley-mode. Furthermore, the endpoint of the ramp in Period 1 is the same as the start point of the ramp in Period 2. In this way, the present disclosure results in a smoother operation at or around the 50% Tpd operating point, as well as providing modest slope compensation for less than 50% Tpd switching cycles.

Finally, the fact that the end point of the compensation ramp in FIG. 7A 715, FIG. 7B 715 and FIG. 7C 715 is the same for all V_OUT ([V_IN/[2*L1]]*Tpd) is not an essential aspect of the disclosure, but allows for easier implementation. The disclosure guarantees that when generating the compensation ramp, a maximum value of current will not be surpassed. The end point value is designed to be less than the value achieved from the basic single constant ramp of Prior Art FIG. 3.

When referring to on times, note that it is [V_OUT/V_IN]*Tpd for peak-mode control (PMOS switch), and [[V_IN−V_OUT]/V_IN]*Tpd for valley mode control (NMOS switch), and that sub-harmonic oscillation is of concern and needs to be compensated for where the switch on time is greater than 50% Tpd.

Figure 7D:
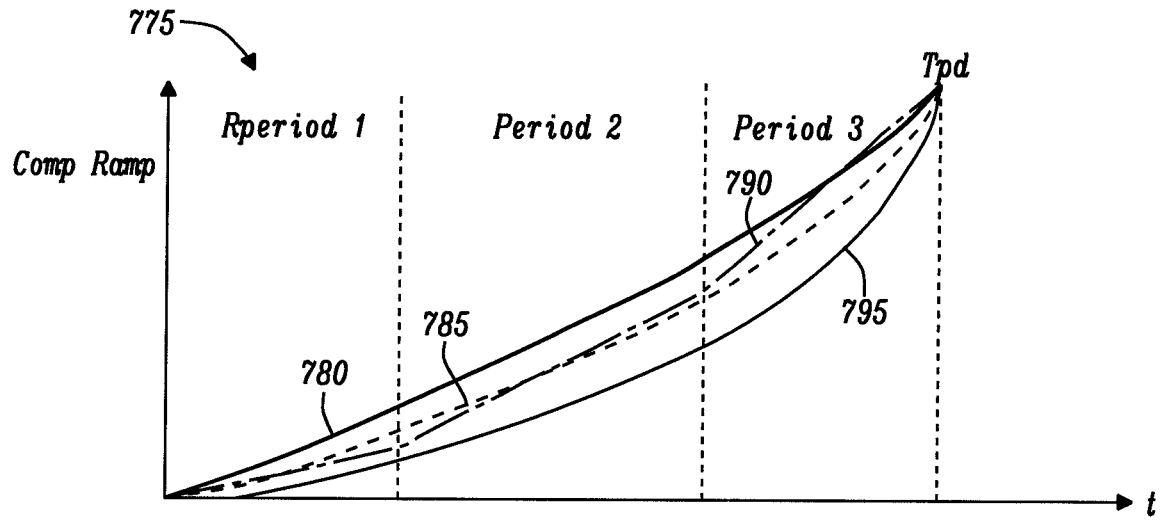
FIG. 7D shows other possible implementations of compensation ramps with an identical end point, of the disclosure.

FIG. 7D shows 775, other possible implementations of compensation ramps of the disclosure with identical end point, cycle time Tpd. N-periods instead of 3 periods are possible, and if N goes to infinity, the corners of the compensation ramps are smoothed out. In a non-limiting example of N-periods, the compensation ramps will look like lines 780, 785, 790, 795, etc. for different duty cycles.

Figure 7E:
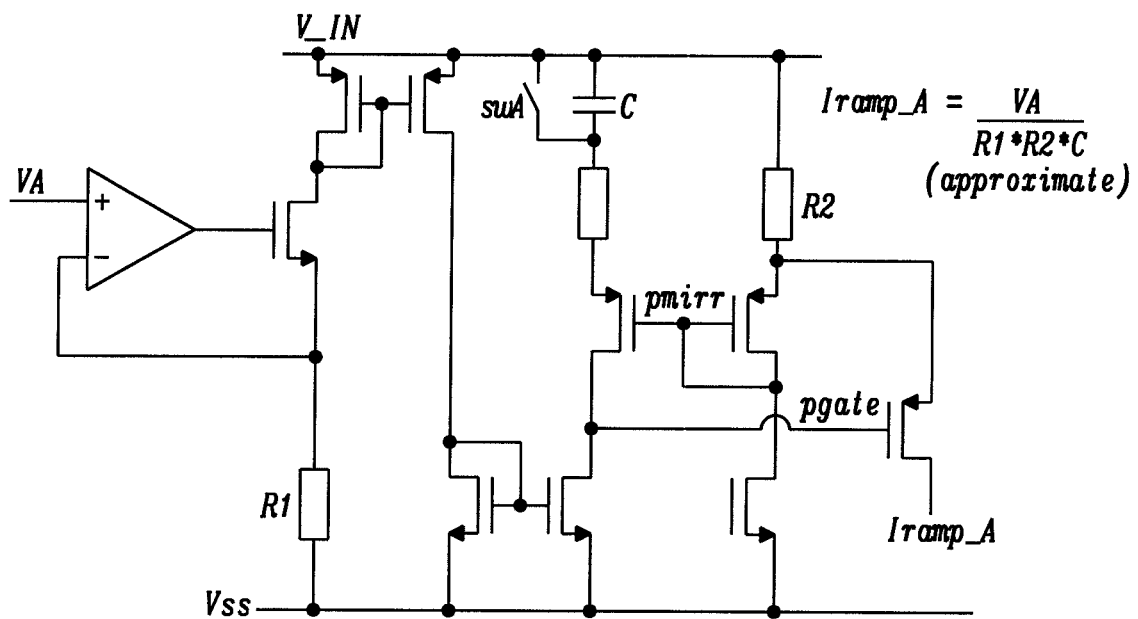
FIGS. 7E and 7F are circuit diagrams detailing how the compensation ramps, of either embodiment of the disclosure, can be generated in FIGS. 7A-7C.
Figure 7F:
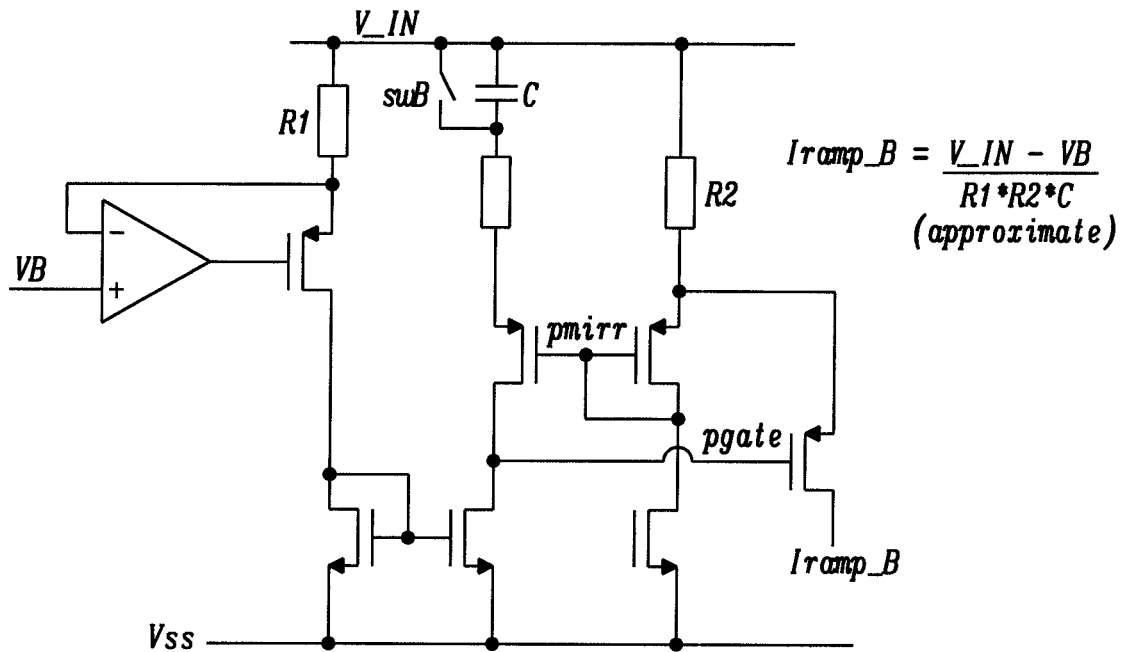

FIGS. 7E and 7F are circuit diagrams detailing how the compensation ramps, for either embodiment of the disclosure, can be generated in FIGS. 7A-7C. Compensation ramp1 and ramp2 can either use the circuit in FIG. 7E or the circuit in FIG. 7F. Compensation ramp1 will control the switch (either swA or swB) by opening it with clk1 and closing it at the end of the switching period Tpd. Compensation ramp2 will control the switch (either swA or swB) by opening it with clk2 and closing it at the end of the on time. To get the final compensation ramp, ramp1 and ramp2 will be summed together.

FIGS. 7E and 7F show the output ramp current at the block level. To get the final ramp for control it would usually be passed through some form of sense device or resistor to create the correct magnitude in the voltage domain. Note that there are various ways to use the circuits, of which some examples follow for a buck converter. It is assumed in the following examples that the R1*R2*C term in FIG. 7E and FIG. 7F is equivalent to L1.

For the ramp with the fixed final value of [V_IN/[2*L1]]*Tpd (embodiment 1):
  Valley mode:
    ramp1=FIG. 7E with VA=V_OUT
    ramp2=FIG. 7F with VB=2*V_OUT
    Total slope during Period 2=[V_IN−V_OUT]/L1
  Peak mode:
    ramp1=FIG. 7F with VB=V_OUT
    ramp2=FIG. 7E with VA=[2*V_OUT−V_IN]
    Total slope during Period 2=V_OUT/L1

For the ramp with the fixed offset at the point of use (embodiment 2):
  Valley mode:
    ramp1=FIG. 7E with VA=2*V_OUT
    ramp2=FIG. 7F with VB=2*V_OUT
    Total slope during Period 2=V_IN/L1
  Peak mode:
    ramp1=FIG. 7F with VB=V_OUT and using components to make equivalent of [V_IN−V_OUT] become 2[V_IN−V_OUT]
    ramp2=FIG. 7E with VA=[2*V_OUT−V_IN]
    Total slope during Period 2=V_IN/L1

Figure 8:
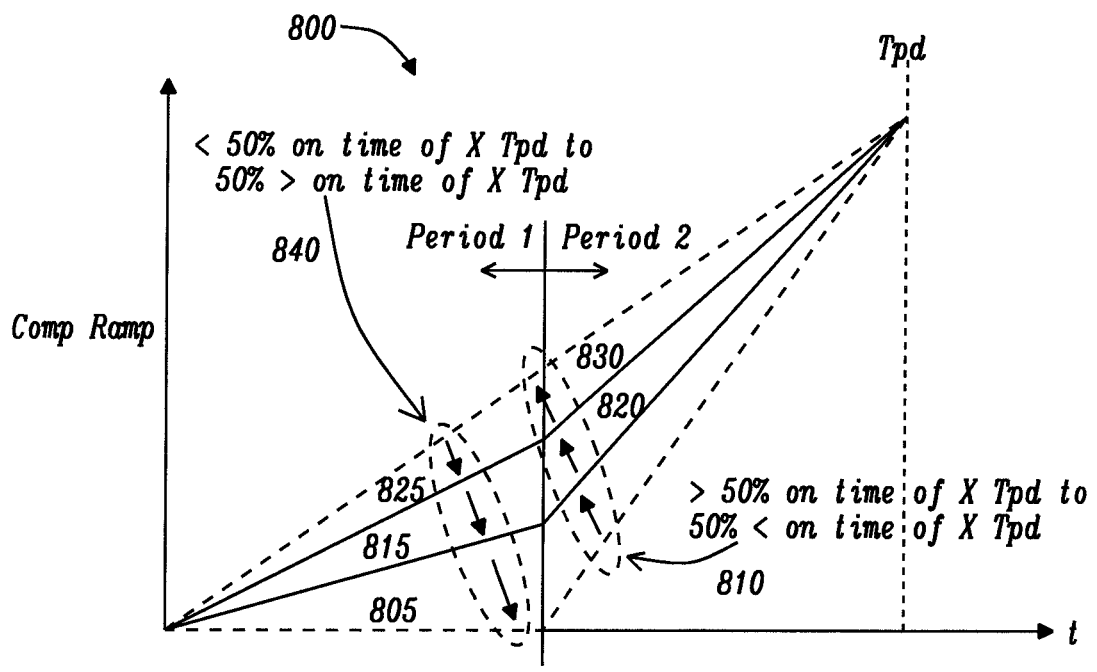
FIG. 8 illustrates the transition of the slope compensation ramp at or near the 50% duty cycle operating condition, of the disclosure.

FIG. 8 illustrates the transition of the slope compensation ramp at or near the 50% duty cycle operating condition. The compensation ramps for on times greater than 50% Tpd and less than 50% Tpd are shown by dotted lines 810 in Period 2 and 840 in Period 1, respectively. FIG. 8 describes an adaptive compensation ramp during the transition from greater than 50% Tpd to less than 50% Tpd, in 810, 820, 830, to 840 for Period 2. FIG. 8 also describes the transition from less than 50% on time to greater than 50%, in 840, 825, 815, to 805 for Period 1.

While operating at greater than 50% Tpd, the slope during Period 1 tends to zero with increasing on time. The slope during Period 2 for peak-mode is [V_OUT/L1], and for valley-mode is [[V_IN−V_OUT]/L1], as shown in FIG. 7A. As the on time decreases and approaches 50% Tpd, the slope during Period 1 is increased and the slope during Period 2 is decreased, according to the equations above. As the on time continues to decrease, the slope during Period 1 is further increased and the slope during Period 2 is further decreased. This is continued until the on time reaches less than 50% Tpd, as shown by FIG. 7B.

While operating at less than 50% Tpd, the slopes during Period 1 and Period 2 are the same, as shown by FIG. 7B. As the on time increases and approaches 50% Tpd, the slope during Period 1 is decreased and the slope during Period 2 is increased, according to the equations above. As the on time continues to increase, the slope during Period 1 is further decreased and the slope during Period 2 is further increased. This is continued until the on time reaches greater than 50% Tpd, as shown by FIG. 7A, where the slope during Period 1 tends to zero with increasing on time and the slope during Period 2 for peak-mode is [V_OUT/L1], and for valley-mode is [V_IN−V_OUT]/L1.

The compensation ramp of the present disclosure is found by changing the equations that create the slopes of the ramp. These conditions occur when the total value of the ramp at the point of compensation, used for low-side or high-side switch on times greater than 50% Tpd, is always the same value for every on time >50% Tpd while still being large enough for effective slope compensation.

Note that introduction of the compensation ramp without correcting for its contribution can introduce current inaccuracy into the system, and the final current outputted by the switching converter. The inaccuracy at the point of use of the compensation ramp varies.

For example, in a valley-mode implementation of embodiment 1, the current inaccuracy at 100% Tpd is [V_IN/[2*L1]]*Tpd, the current inaccuracy at 50% duty cycle is [V_IN/[4*L1]]*Tpd, and the current inaccuracy at 75% Tpd is [5*V_IN/[16*L1]]*Tpd.

For valley mode, if the first slope is changed to [2*V_OUT]/L1, and the second slope changed to [V_IN/L1], then at the point the compensation ramp is used, the value needed to correct for this inaccuracy for on times >50% Tpd is always [V_IN/[2*L1]]*Tpd (i.e. constant for all V_OUT). For peak mode, the first slope becomes [2*[V_IN−V_OUT]/L1] and the second slope becomes [V_IN/L1], to give the same value needed for correction as in the valley mode case.

For valley-mode, at 50% Tpd where V_OUT=V_IN/2, the first and in this case the total slope contribution is [V_IN/L1]*0.5*Tpd=[V_IN/[2*L1]]*Tpd. At 75% Tpd where V_OUT=V_IN/4, the total slope of the compensation ramp is [2*V_IN/[4*L1]]*0.5*Tpd+[V_IN/L1]*0.25*Tpd= [V_IN/[2*L1]]*Tpd.

This results in a constant offset for all on times >50% Tpd for all V_OUT where a compensation ramp is required in steady state conditions, which is simple to subtract from, and correct the measurement. Even for small amounts of error in the system, the offset would be quick to correct as the compensation ramp is close to the value that is needed.

The present disclosure can also be used with current-mode in other DC-DC switching converters, where the compensation ramp may add an offset, and the disclosure works to reduce that offset.

In summary, the present disclosure addresses the issue of the large offset a compensation ramp introduces. It also reduces jitter for on times less than 50% Tpd using two different slopes for the ramp. Additionally, it reduces any discontinuities at the 50% duty cycle point, where the slope changes between two compensation ramps. The disclosure specifically claims a compensation ramp where the ramp rate for the first half of the switching period, for on times greater than 50% Tpd, decreases with increasing on time until, and at 100% Tpd, the ramp rate for the first half is approximately zero.

In addition, the disclosure specifically claims a ramp where the ramp rate for the second half of the switching period, for on times greater than 50% Tpd, decreases with decreasing on time until, at a duty of 50%, the ramp rate is equal to the ramp rate used for the first half of the switching period.

Furthermore, the disclosure specifically claims at duty cycles of around 50% there is no discontinuity in the ramp slope, and that the appropriate ramp is added for on times greater than 50% Tpd, with the minimum offset added by the ramp during the first half of the switching period.

The first embodiment of the disclosure arranges the ramp rates so that the maximum offset the ramp could possibly add, the peak offset at the end of a switching period, is constant for all V_OUT. This is useful as it provides a clear bound to the offset that can be added. The second embodiment arranges the ramp rates so that the offset actually added, at all on times >50% Tpd, is constant for all V_OUT. This is useful as it means any correction for this offset can be simplified.

The present disclosure is broad in scope, covering multiple two-stage compensation ramp scenarios. It is useful in a current-mode switching converter, where the current demand signal is used as a proxy for the output current. When the system generates the current demand signal, the current control loop ensures the output current matches the demand signal, by adding a compensation ramp. The offset of the compensation ramp introduces error, which for valley-mode phases can be extensive. The circuit of the disclosure is designed to adaptively eliminate this error, and as the duty cycle changes, so does the offset. The adaptive circuit manages the changing offset, by holding the offset almost constant, greatly improving performance.

FIG. 9 is flow chart 900 of a method for adaptive slope compensation in a current-mode controlled DC-DC switching converter. The steps include 910, providing a compensation ramp comprising two or more zones, with each zone having a distinct slope value. The steps also include 920, modifying the slope compensation ramp and the zones that make up the compensation ramp responsive to a duty cycle. The steps also include 930, maintaining a maximum ramp current contribution for all values of an output voltage V_OUT at the end of the switching period (embodiment 1), or for on times >50% of the switching cycle time Tpd, a constant offset value for all V_OUT at the point of use (embodiment 2).

The main advantage of one or more embodiments of the present disclosure include a compensation ramp that can be implemented with a constant offset value for all V_OUT, while most compensation ramps are achieved with a dynamic value, or not achieved at all.

While particular embodiments of the present disclosure have been illustrated and described, it will be understood by those skilled in the art that various changes in form and details may be made without departing from the spirit and scope of the invention.

The invention claimed is:

1. An adaptive slope compensation circuit, in a current-mode controlled DC-DC switching converter, comprising:
   a compensation ramp,
      comprising two or more zones, with each zone having a distinct slope value,
      configured to be responsive to a duty cycle,
      wherein the slope value for a second zone, for on times greater than 50% of the total switching cycle time (Tpd), is configured to decrease with decreasing on time until, at the duty cycle of 50%, the slope value is equal to a slope value used for a first zone,
      and
      configured to maintain a maximum ramp current contribution for all values of an output voltage at an end of a switching period,
      or for on times greater than 50% of a total switching cycle time (Tpd), a resulting offset from said compensation ramp is constant,
      wherein a clock in anti-phase with a main clock is provided, to control switching of said compensation ramp.

2. The circuit of claim 1, wherein each of said slope values is configured to vary based on said duty cycle.

3. The circuit of claim 1, wherein the slope value for the first zone, for on times greater than 50% of the total switching cycle time (Tpd), is configured to decrease with increasing on time until, at an on time of 100% (Tpd), the slope value is approximately zero.

4. The circuit of claim 1, wherein the slope value for the first zone and the slope value for the second zone are approximately the same for the duty cycle of about 50%.

5. The circuit of claim 1, wherein said two or more zones comprise two zones to produce a final compensation ramp.

6. The circuit of claim 1, wherein said two or more zones comprise N zones to produce a final compensation ramp.

7. The circuit of claim 1, wherein the DC-DC switching converter is a Buck switching converter.

8. The circuit of claim 1, wherein the DC-DC switching converter is a Boost or other type of DC-DC switching converter.

9. A method for adaptive slope compensation, in a current-mode controlled DC-DC switching converter, comprising:
   providing a compensation ramp comprising two or more zones, with each zone having a distinct slope value, wherein decreasing a slope value for a second zone with decreasing on time, for on times greater than 50% of the total switching cycle time (Tpd), until at the duty cycle of 50%, the slope value is equal to a slope value used for a first zone;

modifying the compensation ramp and the zones that make up the compensation ramp responsive to a duty cycle;

providing a clock in anti-phase with a main clock, to control switching of the compensation ramp; and maintaining a maximum ramp current contribution for all values of an output voltage at an end of a switching period, or for on times greater than 50% of a total switching cycle time (Tpd), a resulting offset from the compensation ramp is constant.

10. The method of claim 9, wherein each of said slope values varies based on said duty cycle.

11. The method of claim 9 decreasing the slope value for the first zone with increasing on time, for on times greater than 50% of the total switching cycle time (Tpd), until at 100% (Tpd), the slope value is approximately zero.

12. The method of claim 9, wherein a final compensation ramp comprises two zones of said two or more zones.

13. The method of claim 9, wherein a final compensation ramp comprises N zones of said two or more zones.

* * * * *